(12) United States Patent
Richter et al.

(10) Patent No.: US 8,235,448 B2
(45) Date of Patent: Aug. 7, 2012

(54) HEADLINER FOR CONVERTIBLE VEHICLE

(75) Inventors: Markus Richter, Tecklenburg (DE); Heiner Bensmann, Georgsmarienhütte (DE); Holger Schramm, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 72 days.

(21) Appl. No.: 12/666,121

(22) PCT Filed: May 31, 2008

(86) PCT No.: PCT/DE2008/000917
§ 371 (c)(1),
(2), (4) Date: May 5, 2010

(87) PCT Pub. No.: WO2009/000224
PCT Pub. Date: Dec. 31, 2008

(65) Prior Publication Data
US 2010/0225146 A1 Sep. 9, 2010

(30) Foreign Application Priority Data
Jun. 22, 2007 (DE) .......................... 10 2007 028 907

(51) Int. Cl.
*B60J 7/08* (2006.01)

(52) U.S. Cl. ................................................. 296/107.06
(58) Field of Classification Search ............. 296/107.06
See application file for complete search history.

(56) References Cited

U.S. PATENT DOCUMENTS

2009/0085381 A1   4/2009   Schonenback

FOREIGN PATENT DOCUMENTS

| DE | 3914639 A1 | 11/1990 |
| DE | 4031270 C1 | 10/1991 |
| DE | 10147016 A1 | 4/2003 |
| DE | 10147017 A1 | 4/2003 |
| DE | 10236511 B3 | 2/2004 |
| DE | 10242440 A1 | 3/2004 |
| DE | 10360326 A1 | 7/2005 |
| DE | 102005015679 A1 | 10/2006 |
| EP | 1716014 A2 | 11/2006 |

*Primary Examiner* — Joseph Pape
(74) *Attorney, Agent, or Firm* — Gifford, Krass, Sprinkle, Anderson & Citkowski, P.C.; Douglas L. Wathen

(57) ABSTRACT

This invention relates to a convertible vehicle having a movable roof supported by lateral linkage parts. An inner lining or headliner faces the passenger compartment when the roof is closed. The outer transverse margins of the headliner extend below and contact lateral sections, which also serve as carriers for seals for the side window panes.

14 Claims, 12 Drawing Sheets

HEADLINER FOR CONVERTIBLE VEHICLE

REFERENCE TO RELATED APPLICATIONS

This patent application is the United States national phase application of Patent Cooperation Treaty Application No. PCT/DE2008/000917, filed May 31, 2008, which claims priority from German patent application No. DE 10 2007 028 907.5, filed Jun. 22, 2007, the entire content of both of which are incorporated herein by reference.

FIELD OF THE INVENTION

The present invention relates to a convertible vehicle having a roof which is movably supported by lateral linkage parts and which includes a headliner facing the passenger compartment.

BACKGROUND OF THE INVENTION

A number of convertible vehicles are known whose roofs have a separate headliner or inner lining, which faces the passenger compartment. With these designs, there is a conflict in that the inner lining should have as uniform and as large an area as possible when the roof is closed, but the inner lining must become narrower when the roof is folded such that it clears the vertical planes of movement of the lateral linkage parts, which hold the roof, and it is not pinched between inwardly folded linkage parts.

DE 10 2005 042 017 A1 shows an inner lining having outer transverse marginal regions that are attached to pivot flaps. The pivot flaps are disposed above the marginal regions and can be folded inwardly about axes that are disposed lengthways to the vehicle. However, a sharp kink is created in the inner lining, which can lead over time to a visible line therein, especially when the inner lining is made of high-quality material such as Alcantara. In addition, such a design requires a plurality of springs for the movement of the pivot flaps. The springs extend through the inner lining in the inwardly folded state, requiring cut-outs between flaps and substantially disturbing the desired uniform appearance of the inner lining.

SUMMARY OF THE INVENTION

In one embodiment of the present invention, the width of the inner lining is maximized by having the inner lining extend up to and below lateral sections, which also hold the seals for sealing the movable roof to side window panes when the roof is closed. These lateral sections form a frame for the inner lining due to the contact of the inner lining with these sections. The inner lining can be tensioned freely and without transverse support between the marginal supports formed by the lateral sections. This provides a freely hanging and kink-free inner lining extending between the outer longitudinal frames. It is thereby perceived by the occupants as a freely hanging cover over its total clear width between the frames. No kink points occur.

The inner lining is a stable design, which is drawn outwardly so that the outer transverse margin extends into a channel of the lateral sections. This channel is directly adjacent to an outer limb of the lateral sections which carries a seal for the side window panes. The gap between the outer transverse margin of the inner lining and the seal can thereby be particularly small and can preferably be less than five millimeters.

In some embodiments, the inner lining produces a uniform area, which is as large as possible, not only in the transverse direction, but also in the longitudinal direction. Ideally, an area of the inner lining which is continuous outside the rear window and is tensioned free of interruption is made possible from the windshield frame up to the rear end of the roof and respectively up to a few millimeters toward the side panes.

In some embodiments, at least part of the longitudinal length of the inner lining is laterally held by tensioning elements. The tensioning elements extend beneath and to the outside of the lateral linkage parts. It is not only possible to pull the inner lining far to the outside when the roof is closed, but also to effect a retraction of the inner lining into the transverse space between the lateral linkage parts when the roof folds inwardly, by relaxing the tensioning elements in order thus to avoid any interference with the inward folding of the linkage parts.

The clamping elements can extend from the outside into the lateral sections. This pulling from the outside allows broad transverse tensioning of the surface of the inner lining.

For this engagement from the outside, the lateral sections advantageously have an outer limb for the holding of the seal and spaced apart therefrom a further inwardly disposed limb. The inner lining extends below the inner limb and extends into a downwardly open channel between the outer limb and the inner limb. Hidden bores or similar cut-outs for the clamping elements are formed in the channel.

The clamping elements can be formed by pulling cables and may extend such that they relax automatically as the roof folds inwardly, with the corresponding displacement of the roof linkage parts.

A plurality of clamping elements provides even pulling force onto the inner lining when the roof is closed.

If the roof has at least one arched guide surface at its side facing the passenger compartment in the near region of each transverse margin for shaping the inner lining, the tensioning elements do not have to be distributed over the total longitudinal extent of the roof. Instead, the tensioning elements can be provided only in those regions where there is a special need for the retraction of the inner lining in the transverse direction when the roof folds inwardly. For example, the tensioning elements may be provided in the region at the center with respect to the longitudinal extent of the lining.

The inner lining is advantageously movable over the guide surface, which may be fixedly connected to the outer skin of the roof or to linkage parts, and can thereby achieve good tension. The guide surface can, for example, be fixedly connected to a front plate part, for instance, of a retractable hard top.

BRIEF DESCRIPTION OF THE DRAWINGS

Further advantages and details result from an embodiment of the subject matter of the invention shown in the drawings.

DETAILED DESCRIPTION OF THE INVENTION

Figure 1:
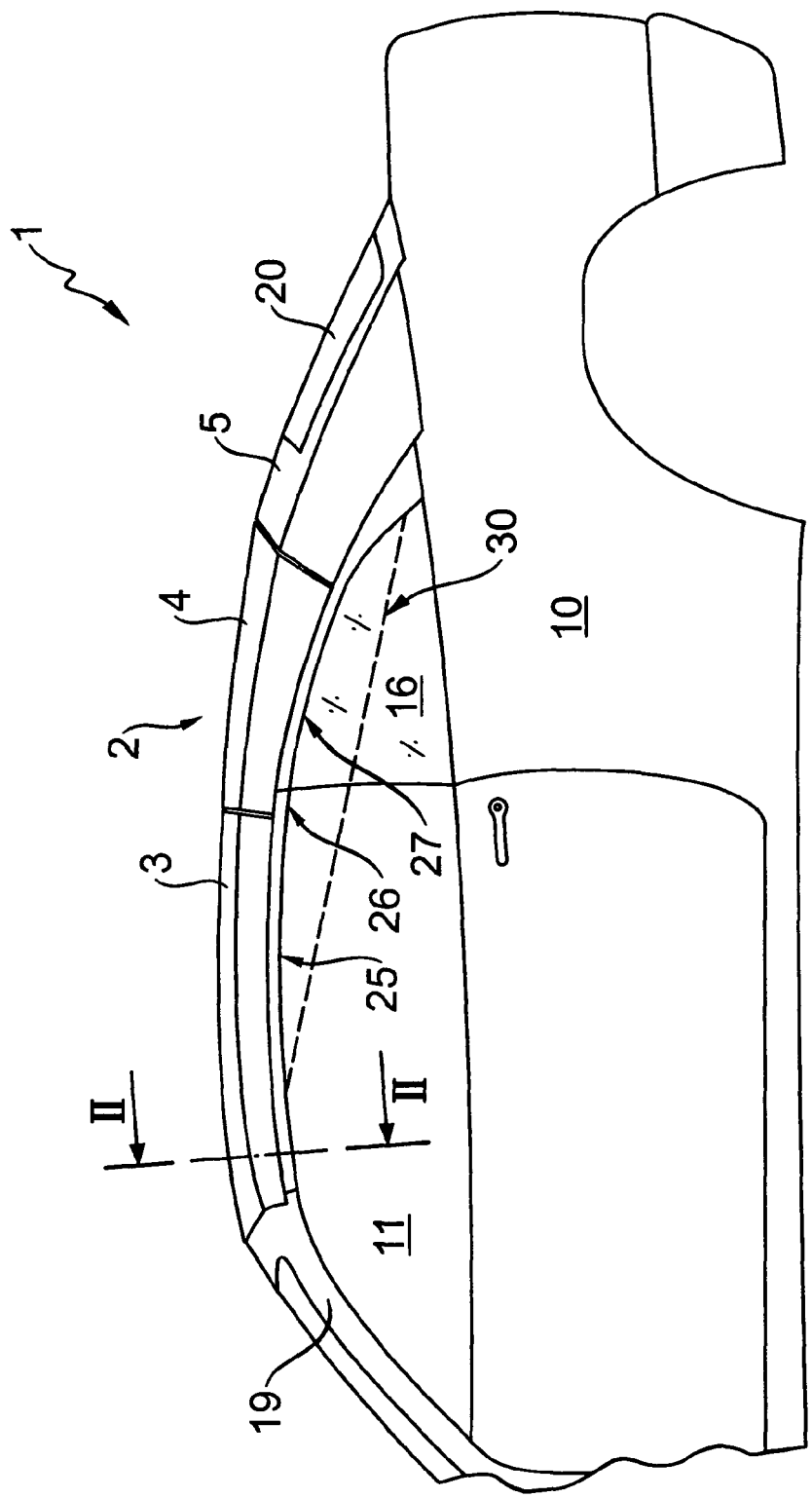
FIG. 1 is a side view of the upper region of a vehicle in accordance with an embodiment of the present invention, including the movable roof shown in a closed position.

A convertible vehicle 1 in accordance with the present invention may, as shown in FIG. 1, include a movable roof 2 having a plurality of solid roof parts 3, 4, 5, forming a so-called retractable hard top (RHT). Alternatively, a soft top covered by a covering is also possible.

In both cases, the roof 2 is movably supported by lateral linkage parts 6, 7, 8, 9. They can be formed in different numbers and shapes depending on the roof shape and on the roof size. The lateral linkage parts start from a main bearing H positioned in the rear region of a vehicle body 10 and one component of the lateral linkage parts extends in the longitudinal vehicle direction up to and below the frontmost roof part, which is here provided with the reference numeral 3.

The movable roof 2 is provided with a cover layer 12, which is a headliner or inner lining, facing the passenger compartment 11 and visible from the passenger compartment. The cover layer can also include further insulating layers and extends over the total roof width when the roof 2 is closed. The outer transverse margins 13 of the inner lining 12 extend so far transversely outwardly that they extend beneath the linkage parts 6, 7, 8, 9 and cover them visually. The transverse margins 13 reach up to and below lateral sections 14. The lateral sections 14 serve as seal carriers for seals 15, which seal to side window panes 16. A plurality of lateral sections 14 are disposed flush to one another, one after another, and can fold inwardly toward one another when the roof is opened. The inner lining 12 contacts and engages into the lateral sections 14 such that the lateral sections serve as lateral frames for the inner lining 12. The lateral sections serve dual functions. Not only do they provide a seal to the side window panes 16, but they also tension the inner lining 12. The inner lining 12 can thus hang freely between the lateral sections 14.

Figure 2:
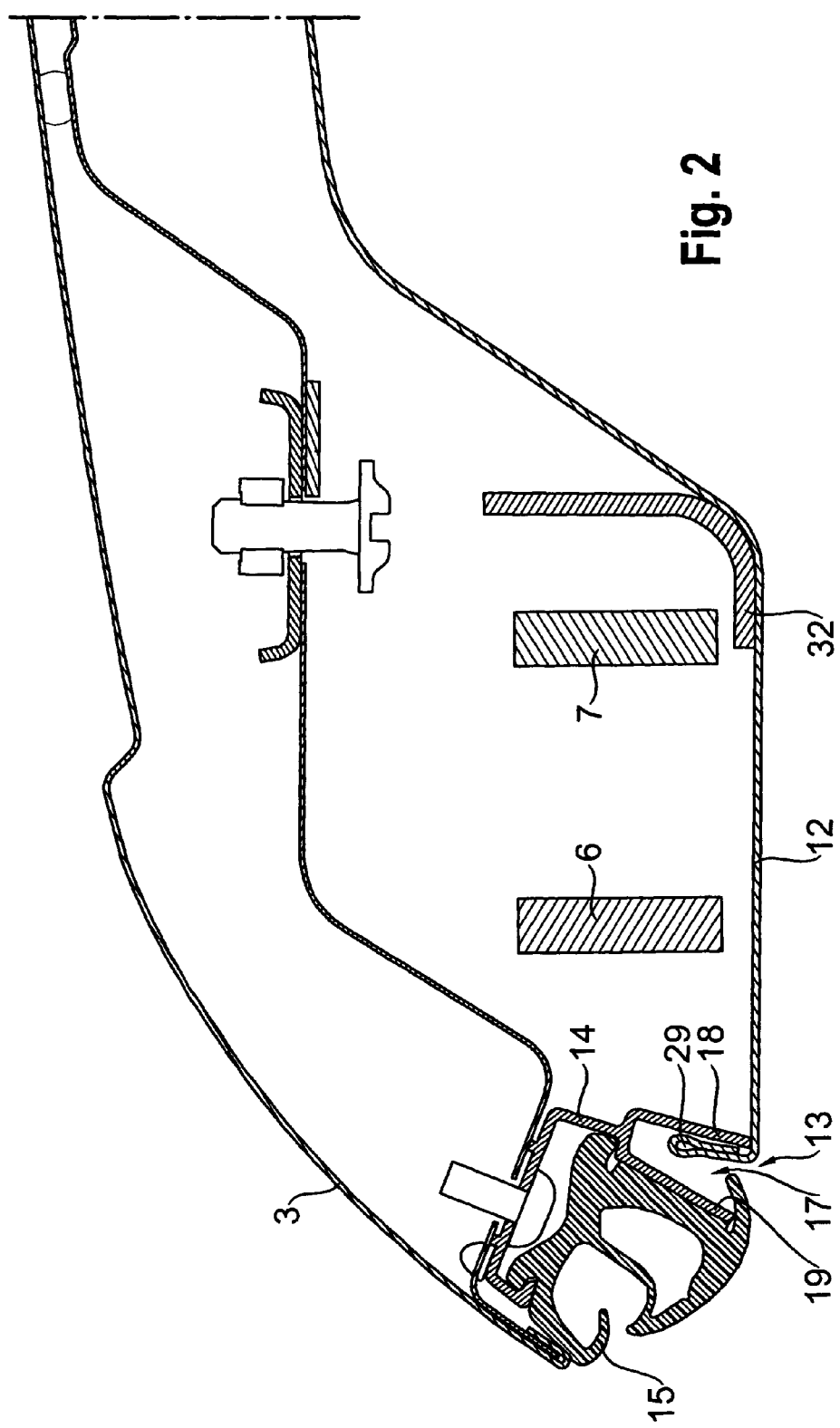
FIG. 2 is a cross sectional view taken along the line II-II in FIG. 1, showing a guide surface shaping the inner lining.
Figure 3:
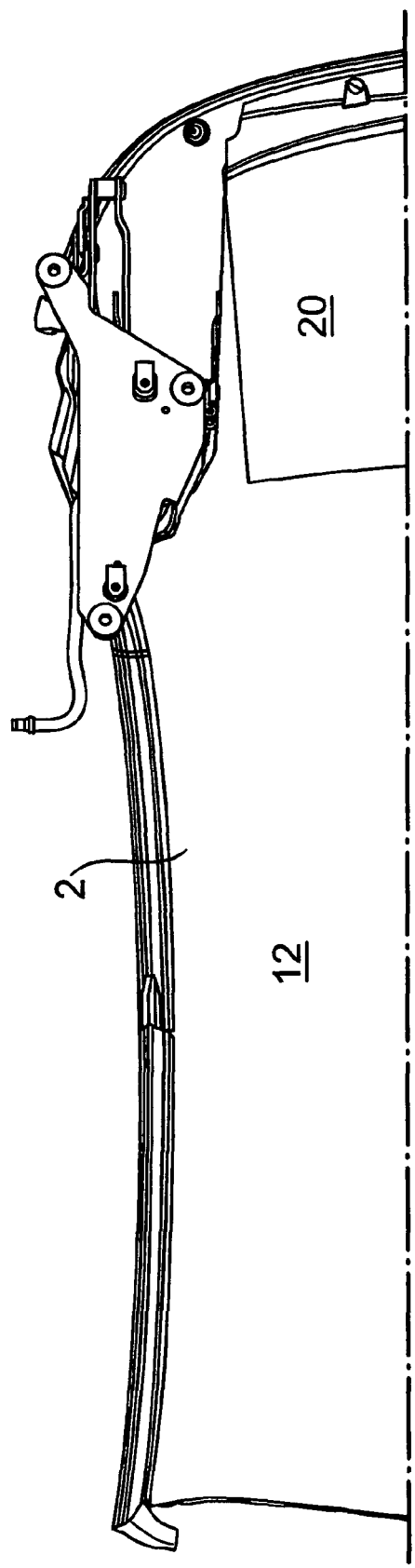
FIG. 3 is a view of the left hand roof region from below.
Figure 4:
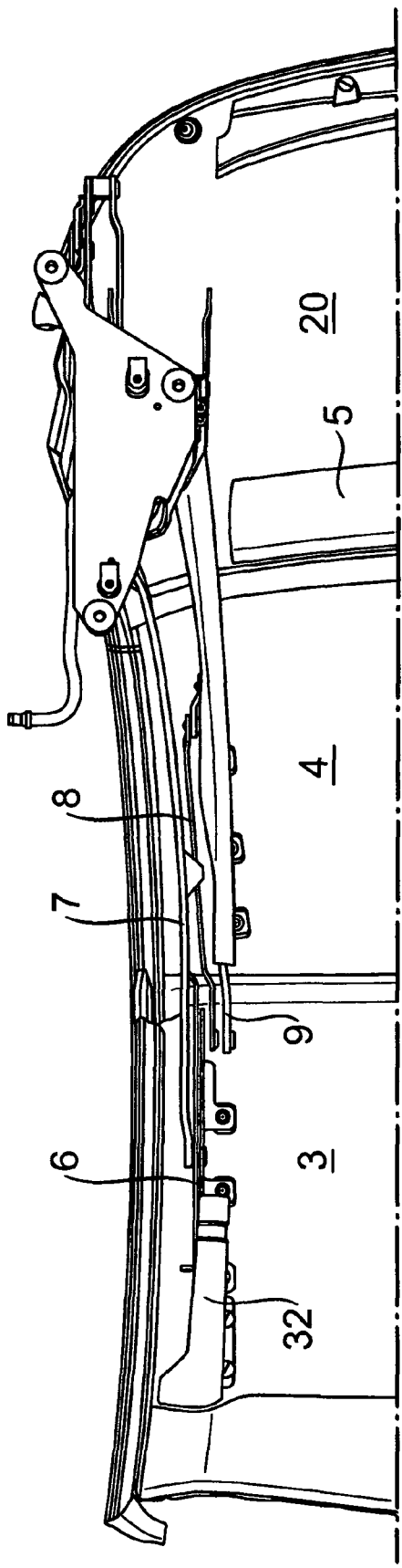
FIG. 4 is a similar view to FIG. 3, but after disassembly of the inner lining.

To enable this transverse tensioning of the inner lining, the outer transverse margin 13 of the inner lining 12 engages into a downwardly open longitudinal channel 17 of the lateral sections 14, when the roof 2 is closed. The outer transverse margin 13 is disposed between an inner limb 18 and an outer limb 19 of the lateral sections 14. The outer limb carries the seal 15, and thus the seal is adjacent to this outer limb 19. The outer transverse margin 13 of the inner lining 12 therefore has a transverse spacing with respect to the side window pane seals 15 of less than 5 millimeters in the transverse direction (FIG. 2). The inner lining 12 adjoins the side window panes 16 almost free of any gap.

The minimized marginal gap at the outer transverse margin 13 can be formed continuously and without interruptions of the longitudinal extent over the total longitudinal region of the inner lining 12 between a front windshield frame 19 and a rear window 20. The entire length of the inner lining 12 extends up to and below the lateral sections 14, and also contacts them, when the roof is closed. But, the inner lining is releasable from the lateral sections 14, at least regionally, when the roof is opened so that transverse incisions or similar interruptions of the inner lining 12 are completely avoided at the joints of the linkage parts. The inner lining has a visually advantageous design which is continuous over a large area and provides security against interference. Any pivot flaps or mutually separate material portions for the linkage covering may be completely avoided. The visual impression from the passenger compartment 11 is significantly improved.

The inner lining 12 is laterally retained, over at least a part of its longitudinal extent, by tensioning elements 21, 22, 23, 31. The tensioning elements extend below the lateral linkage parts 6, 7, 8, 9 and run around the outer side of the linkage parts. The covering of the linkage parts is thereby reliably secured. Nevertheless, when the roof folds inwardly, the inner lining 12 can be pulled transversely inwardly and can thereby clear the linkage parts such that the linkage parts can fold inwardly toward one another without pinching the inner lining 12.

Figure 11:
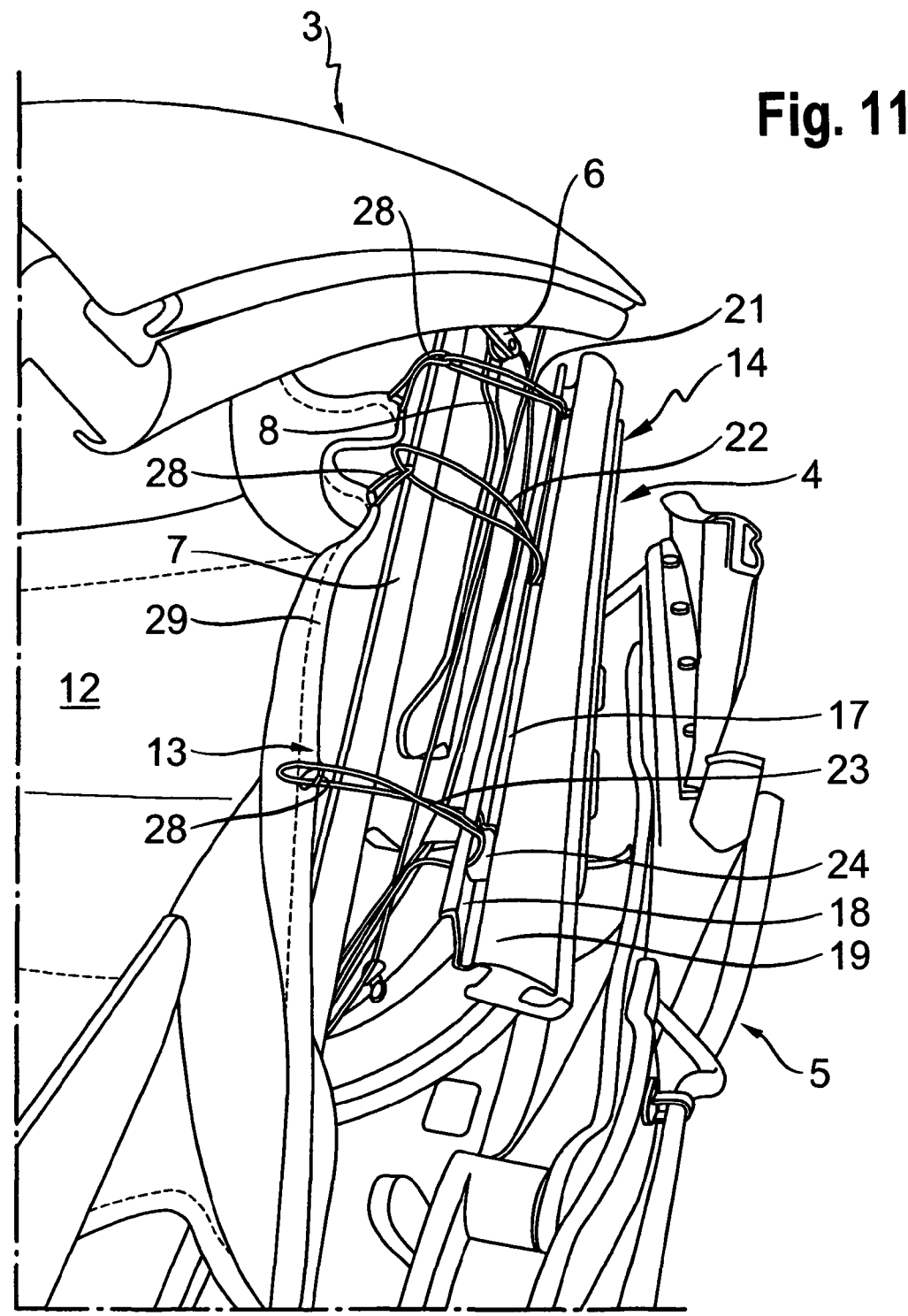
FIG. 11 is a similar view to FIG. 10, with the roof further along in the opening movement, wherein the roof is folding inwardly such that the pulling cables are relaxed.
Figure 12:
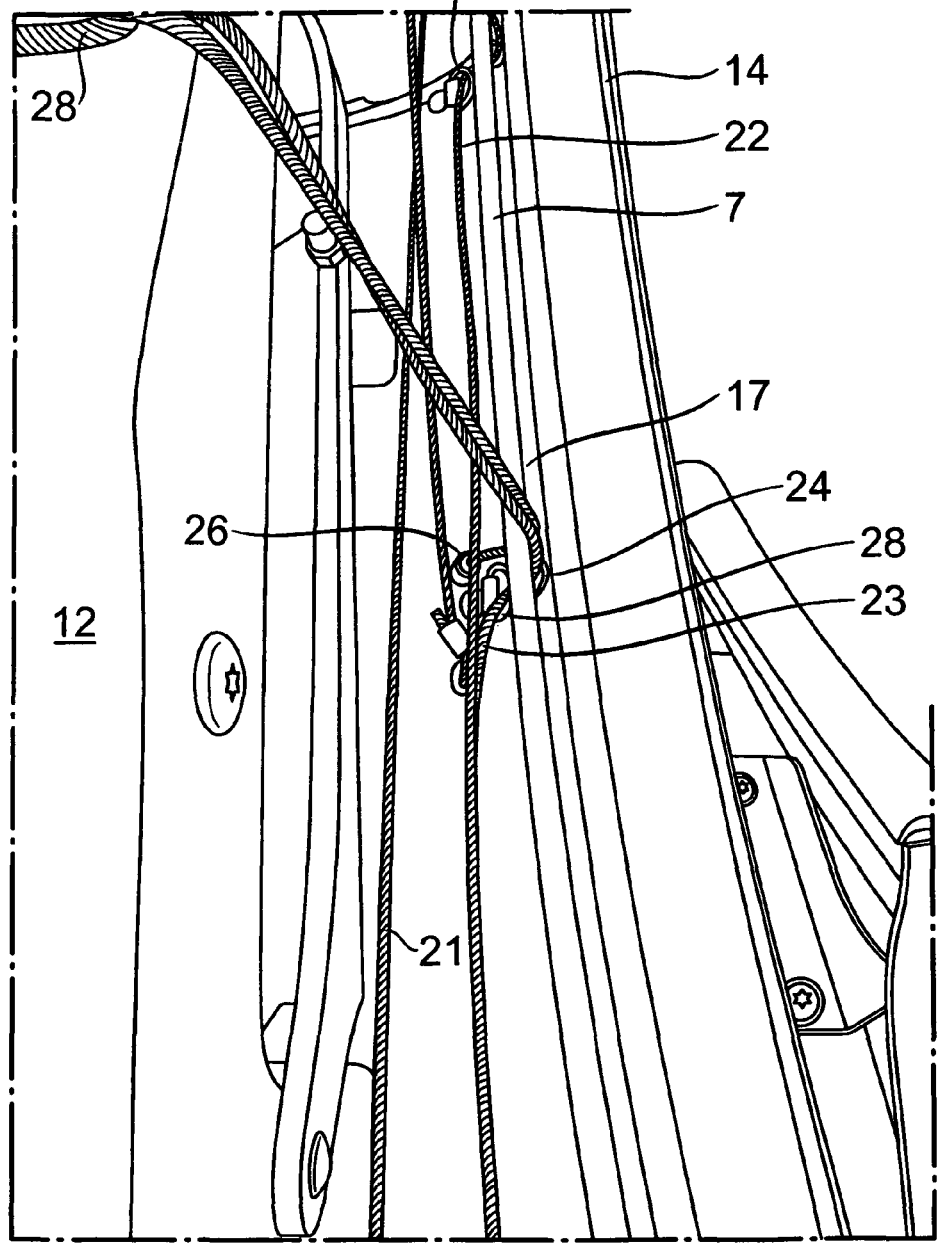
FIG. 12 is a detailed view showing a pulling cable extending from a rear connection around a linkage part to a further connection.

In the illustrated embodiment, the tensioning elements 21, 22, 23, 31 are formed by elastic pulling cables, and may include separate spring elements. The tensioning elements 21, 22, 23, 31 each start from a connection point 25, 26, 27 that is fixed with respect to the roof. The fixed connection point is only illustrated for the rear three tensioning elements 21, 22, 23. The fixed connection point may be near the rear main bearing H. A closer connection point with a length reservoir, for instance via a coil, is also possible. The tensioning elements run through a longitudinal passage 17 and extend from the inside to the outside via cut-outs 24, run outwardly around the linkage parts 6, 7, 8, 9 and engage eyelets 28 of the inner lining 12 at the marginal side. From there, the cables 21, 22, 23 extend from the outside through the cut-outs 24 (FIG. 11) into the longitudinal passage of the lateral sections 14. The cables run longitudinally along the length of the roof to a common connection in the rear roof region near the main bearing H. These tensioning cables 21, 22, 23, three or more in this embodiment, thereby pull the margins of the inner lining 12 into the longitudinal passage 17 when the roof closes. A longitudinal tensioning cable in a side bead 29 of the inner lining 12 is forced from its relaxed position 30 (FIG. 1) into the engagement position in the sections 14. A small number of tensioning cables may be required depending on the extent of the roof.

The inner lining 12 does not have to be able to separate from the longitudinal sections 14 over its entire length. Instead, the lining can be fixed in the channel 17 of the longitudinal section 14 in the front region before the first joint between the linkage part 6 and the linkage parts 7 and 8. The inner lining can be laid over, and tensioned by, an arched guide surface 32 disposed near each transverse margin 13. This arched guide surface may, for example, be made of wire or plastic. If the inner lining 12 is movable over the guide surface 32, which may be fixed to the outer skin of the roof or to an upper hoop of the roof (FIG. 2), a fold-free transverse tensioning of the inner lining 12 is achieved.

Figure 5:
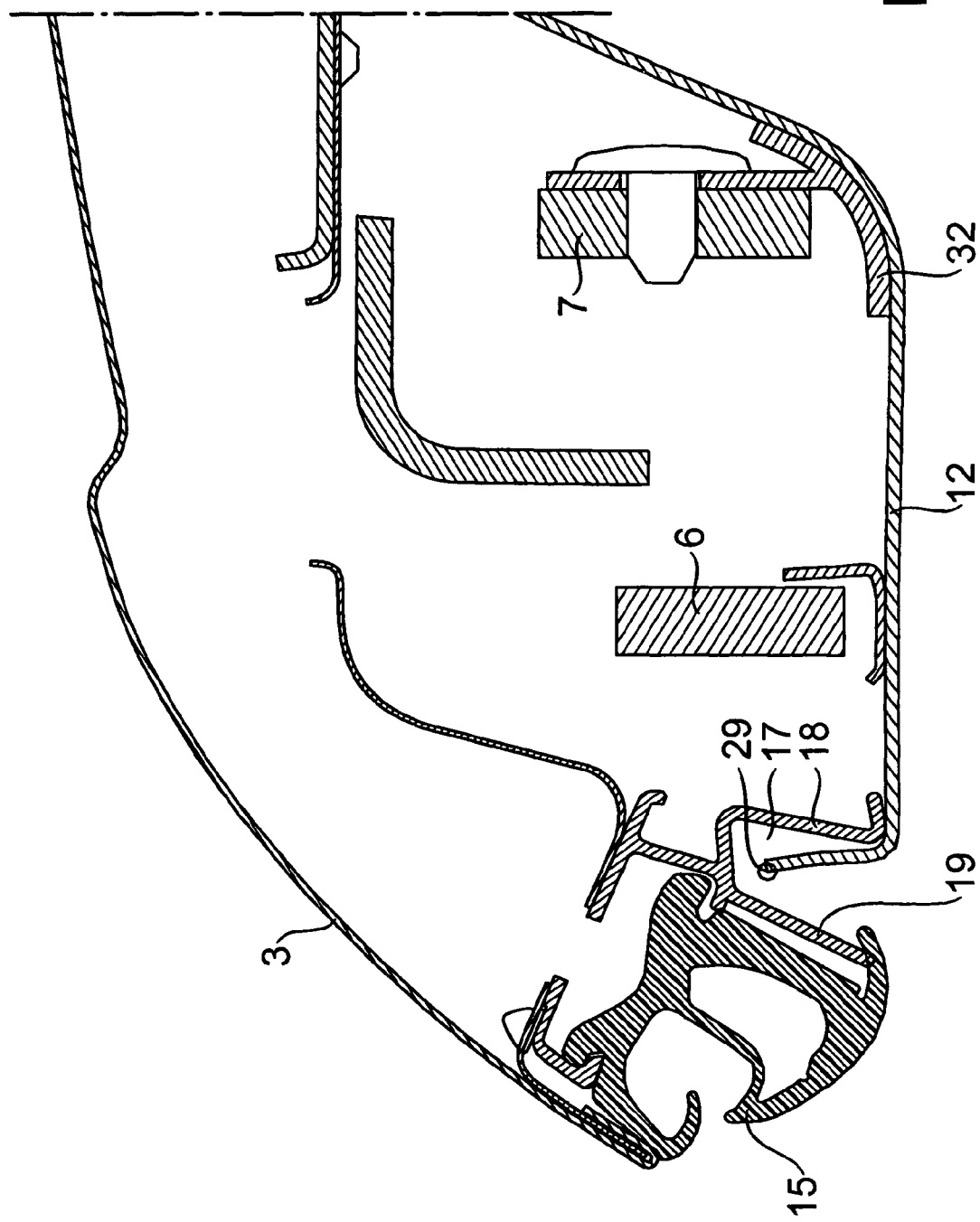
FIG. 5 is a similar view to FIG. 2, but in an alternative embodiment in which the guide surface is connected to a front linkage part.
Figure 6:
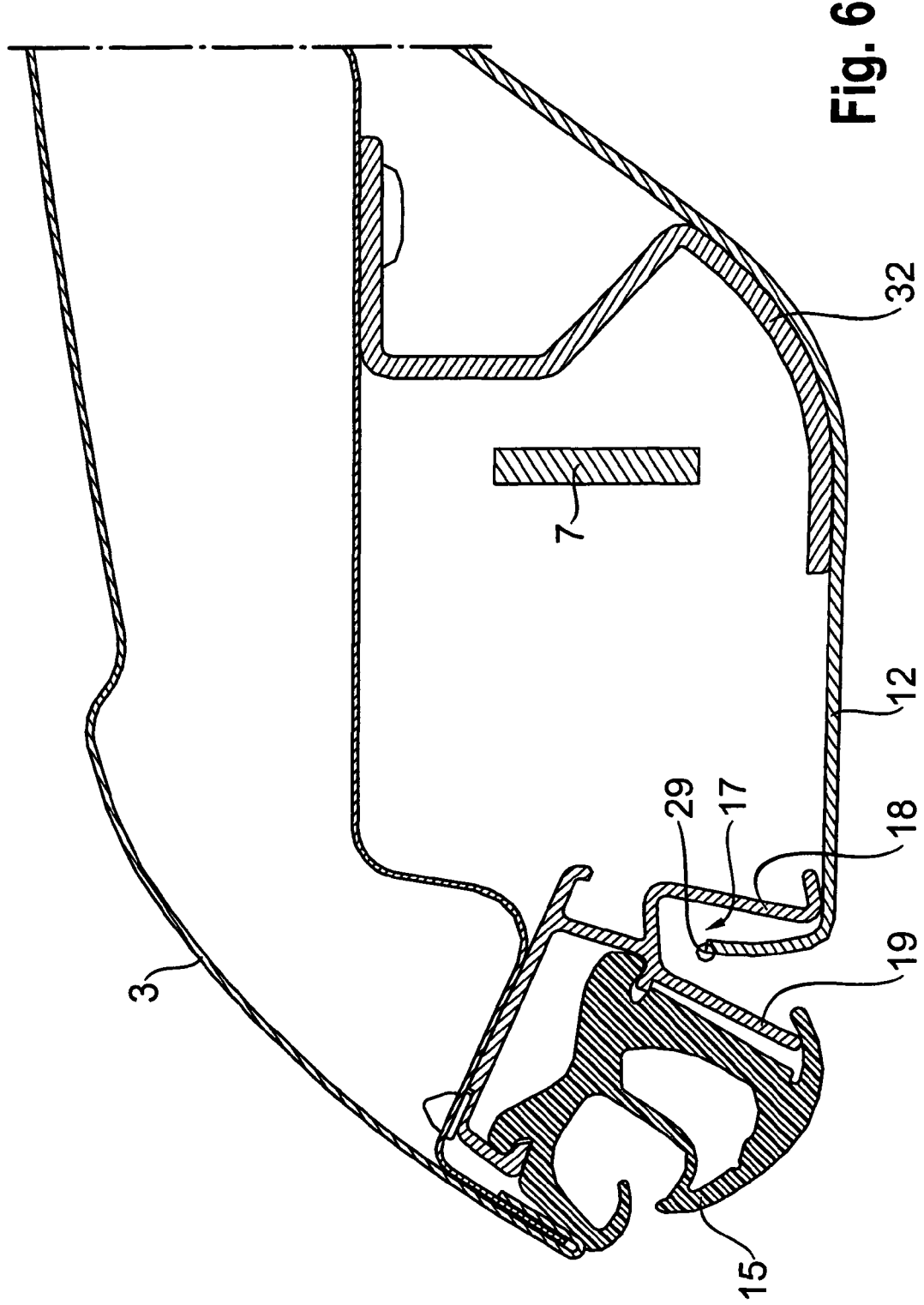
FIG. 6 is a similar view to FIG. 5, but in an alternative embodiment in which the guide surface is connected to a front plate part of the roof.
Figure 7:
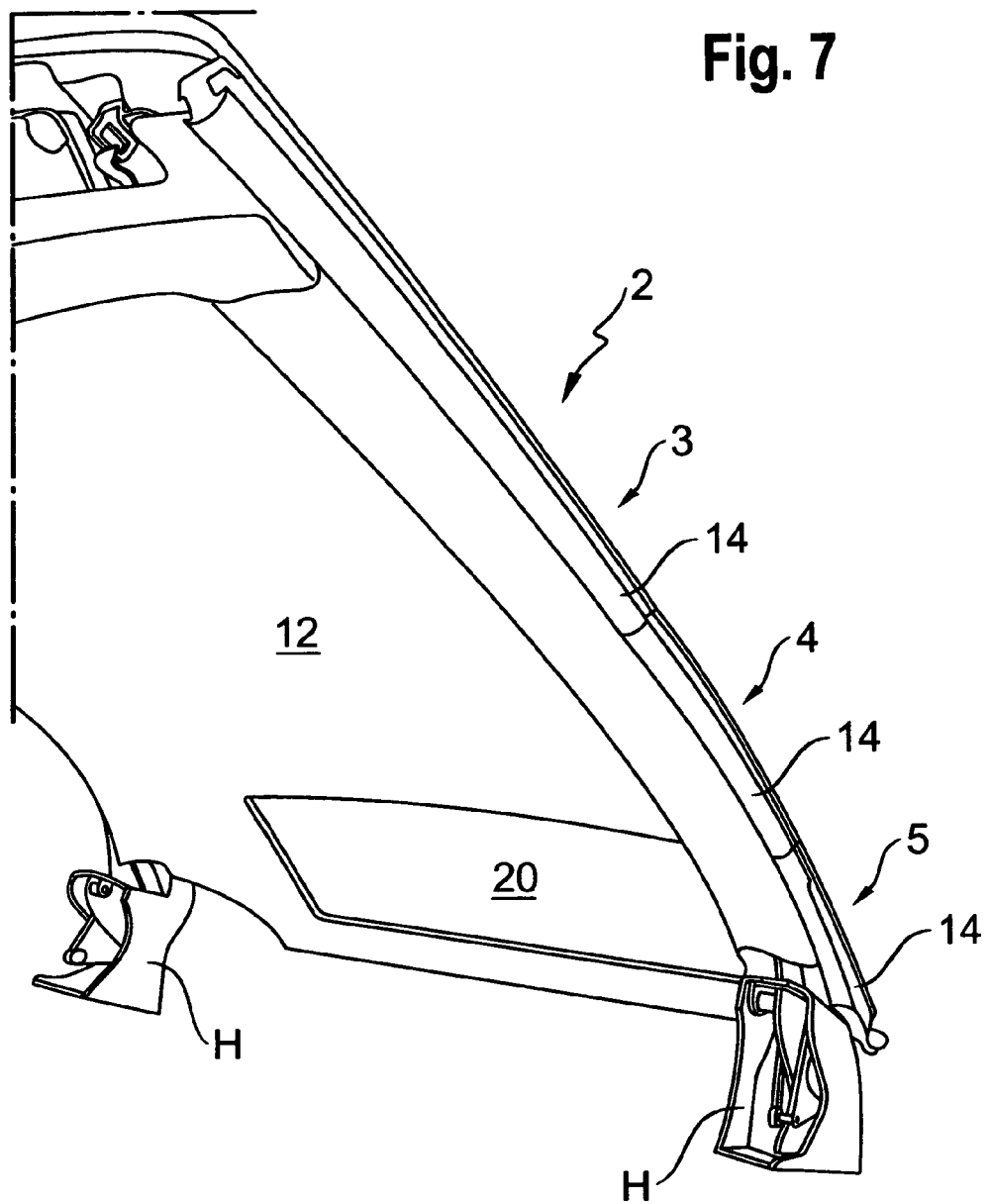
FIG. 7 is a oblique perspective view from the front left of the roof at the beginning of the opening movement.
Figure 8:
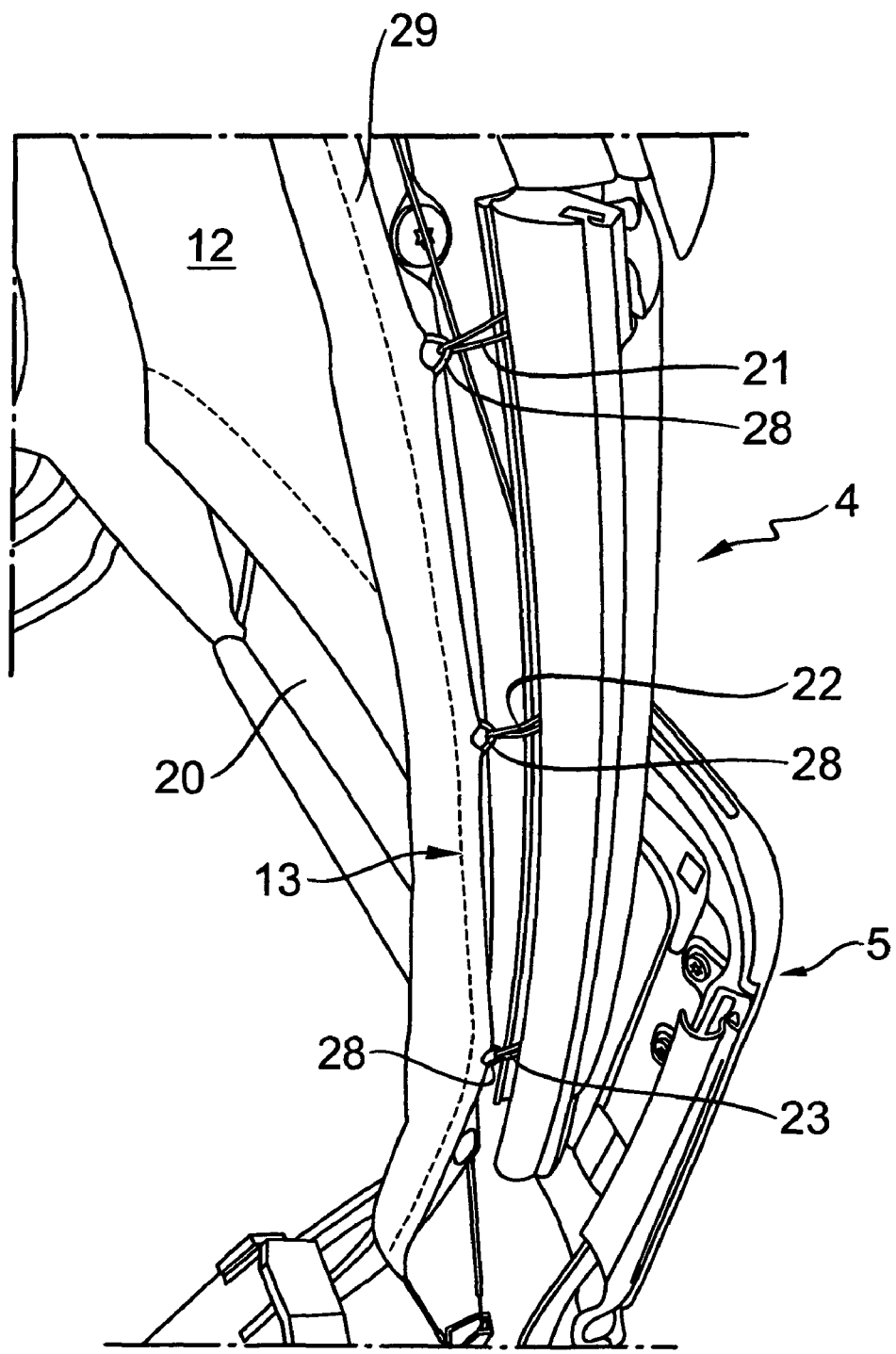
FIG. 8 is a view at a similar perspective to FIG. 7 showing the center and rear regions of the roof during the opening movement.
Figure 9:
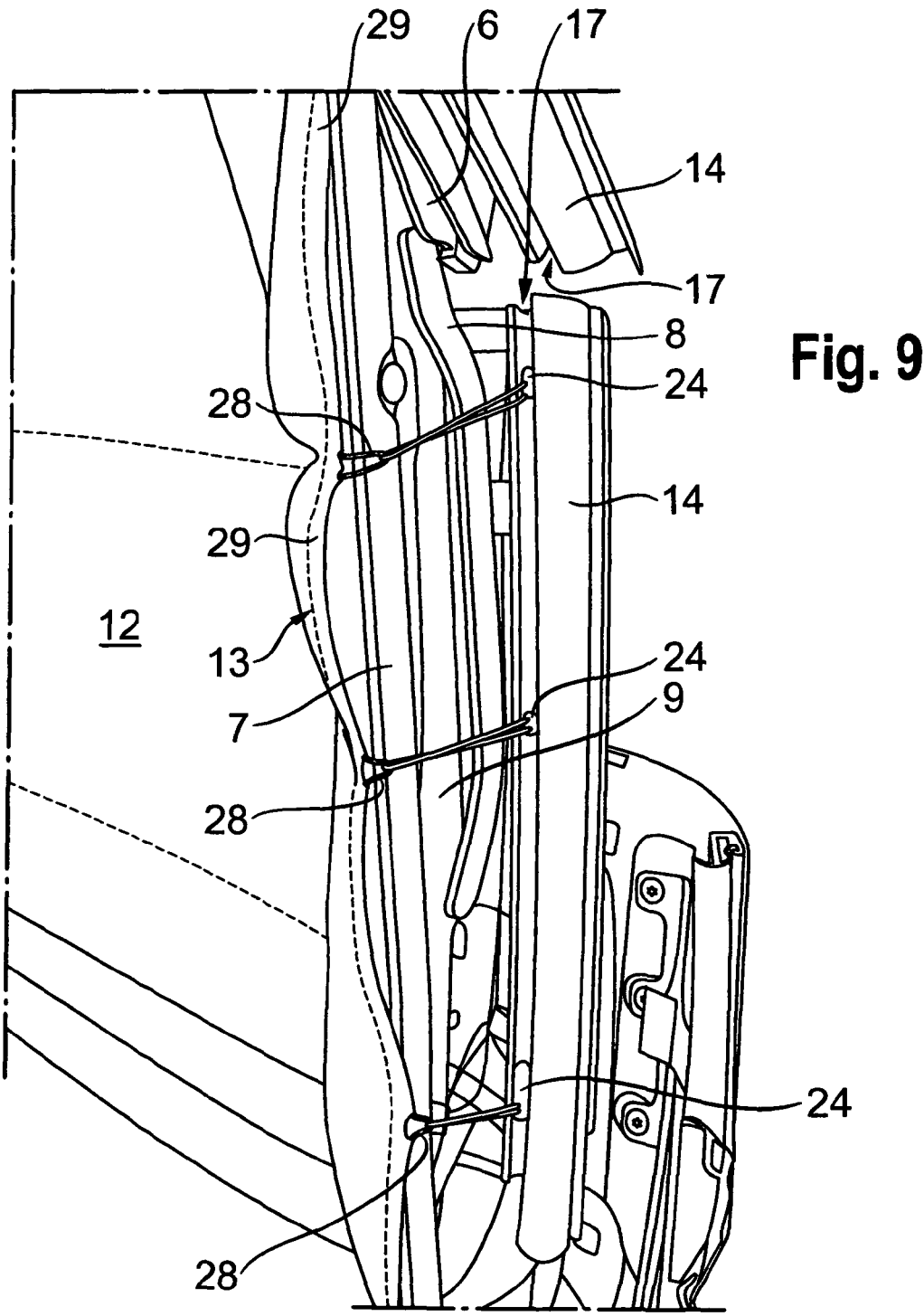
FIG. 9 is a similar view to FIG. 8 with the roof further along in the opening movement.
Figure 10:
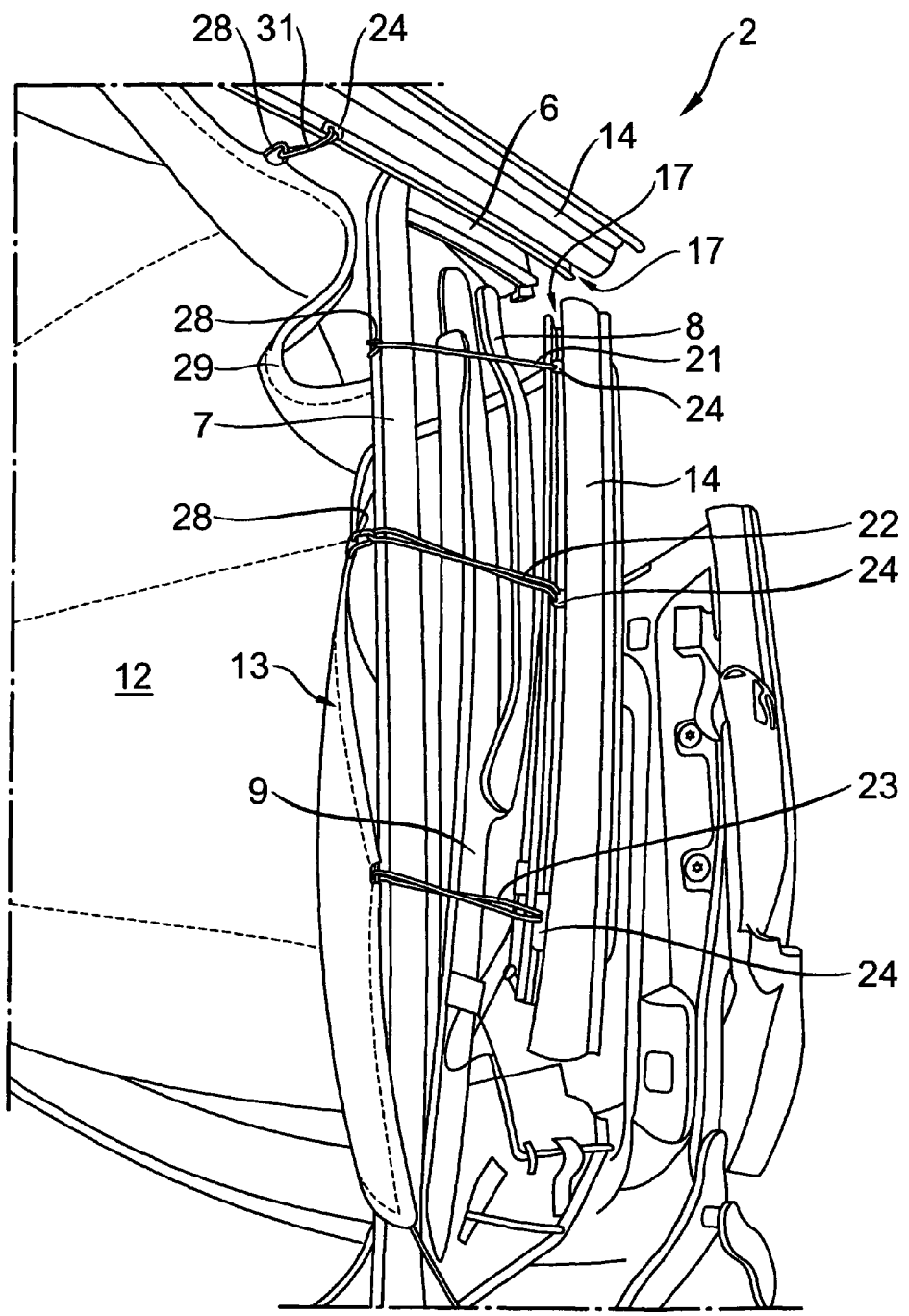
FIG. 10 is a similar view to FIG. 9, with the roof further along in the opening movement, approximately at the maximum tensioned position of the pulling cables tensioning the inner lining.

Alternatively, the convexly curved guide surface, which may be smooth, may be connected to one of the linkage parts 6, 7 as illustrated in FIG. 5. The inner lining 12 is then pulled into shape over the guide surface 32 when the roof closes. It is also possible to integrally design a connector. It is not necessary to sew a shaping element to the inner lining 12. This avoids interrupting the continuous surface with seams.

A vehicle roof 2 having the named properties for the forming of the inner lining 12 is claimed separately.

As will be clear to those of skill in the art, the herein disclosed embodiments of the present invention may be altered without departing from the scope or teaching of the present invention. It is the following claims, including all equivalents, which define the scope of the invention.

The invention claimed is:

1. A convertible vehicle comprising:
   a vehicle body with a passenger compartment defined therein;
   a movable roof having a closed position and an open position, the movable roof having lateral sections disposed at the side edges of the roof;
   lateral linkage parts supporting the movable roof for movement with respect to the vehicle body; and
   a headliner facing the passenger compartment when the movable roof is in the closed position, the headliner having outer transverse margins extending to and below the lateral sections of the roof, the outer transverse margins contacting the lateral sections;
   wherein the lateral sections are carriers for seals for side window panes of the vehicle.

2. A convertible vehicle in accordance with claim 1, wherein:
   the lateral sections each have an outer limb that carries one of the seals for the side panes, each lateral section further having a channel that is directly adjacent the outer limb; and
   the outer transverse margins of the headliner each engage into the channel of one of the lateral sections.

3. A convertible vehicle in accordance with claim 1, wherein:
   the outer transverse margin of the headliner is spaced from one of the seals by a transverse spacing of less than five millimeters.

4. A convertible vehicle in accordance with claim 1, wherein:
   the outer transverse margins of the headliner extend continuously and without interruption in a longitudinal direction between a front windshield frame and a rear window below the lateral sections.

5. A convertible vehicle in accordance with claim 1, further comprising:
   tensioning elements operable to laterally hold the headliner over at least a part of its longitudinal extent, the tensioning elements extending beneath and to the outside of the lateral linkage parts.

6. A convertible vehicle in accordance with claim 5, wherein:
   the tensioning elements extend into the lateral sections.

7. A convertible vehicle in accordance with claim 6, wherein:
   the lateral sections have an outer limb to hold the seal and an inwardly disposed limb, the inwardly disposed inner limb being spaced from the outer limb in a transverse direction, a channel being defined between the inner limb and the outer limb; and
   the headliner extends under the inner limb, and the outer transverse margins of the headliner each engage into the channel of one of the lateral sections.

8. A convertible vehicle in accordance with claim 5, wherein:
   the tensioning elements are pulling cables.

9. A convertible vehicle in accordance with claim 8, wherein:
   the pulling cables engage an eyelet in the headliner and extend from there to a connection in a rear roof region.

10. A convertible vehicle in accordance with claim 9, wherein:
    at least three tensioning elements are provided for each transverse margin of the headliner.

11. A convertible vehicle in accordance with claim 1, wherein:
    the movable roof is a retractable hard top having a plurality of roof parts which are separate from one another, the roof parts each being rigid.

12. A convertible vehicle in accordance with claim 1, wherein:
    the movable roof includes at least one arched guide surface facing the passenger compartment, the arched guide surface being disposed near to one of the transverse margins of the headliner to provide a shaped contact surface between the headliner and the roof.

13. A convertible vehicle in accordance with claim 12, wherein:
    the headliner is movable, while closing the roof, over the guide surface, the guide surface being fixedly connected to rigid roof plates of the movable roof or to one of the linkage parts.

14. A movable roof for a convertible vehicle of the type having a vehicle body with a passenger compartment defined therein, the movable roof comprising;
    a movable roof having a closed position and an open position, the movable roof having lateral sections disposed at the side edges of the roof;
    lateral linkage parts supporting the movable roof for movement with respect to the vehicle body; and
    a headliner facing the passenger compartment when the movable roof is in the closed position, the headliner having outer transverse margins extending to and below the lateral sections of the roof, the outer transverse margins contacting the lateral sections;
    wherein the lateral sections are carriers for seals for side window panes of the vehicle.

* * * * *